(12) United States Patent
Jeon (10) Patent No.: US 8,373,942 B1
(45) Date of Patent: Feb. 12, 2013

(54) BASE FOR MOTOR AND HARD DISK DRIVE INCLUDING THE SAME

(75) Inventor: Il Geun Jeon, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 0 days.

(21) Appl. No.: 13/325,422

(22) Filed: Dec. 14, 2011

(30) Foreign Application Priority Data

Sep. 23, 2011 (KR) .................. 10-2011-0096166

(51) Int. Cl.
*G11B 5/012* (2006.01)
(52) U.S. Cl. .................................... 360/97.11
(58) Field of Classification Search ............ 360/97.11
See application file for complete search history.

(56) References Cited

U.S. PATENT DOCUMENTS

| 5,177,650 | A | * | 1/1993 | Jabbari et al. | 360/99.08 |
| 5,572,384 | A | * | 11/1996 | Kumagai et al. | 360/99.08 |
| 6,204,996 | B1 | * | 3/2001 | MacLeod | 360/99.08 |
| 7,031,106 | B2 | * | 4/2006 | Miyazaki | 360/99.08 |
| 2005/0206255 | A1 | * | 9/2005 | Yoshino et al. | 310/71 |

FOREIGN PATENT DOCUMENTS

JP  11-007750  1/1999

\* cited by examiner

*Primary Examiner* — David D Davis (57) ABSTRACT

There is provided a base for a motor, the base including: a mounting part having a core mounted therein, the core having a coil wound therearoud in order to generate rotational driving force of a motor; a body part extended from the mounting part in an outer diameter direction; and a first step part formed by depressing a lower surface of the body part facing the core, towards the core, and accommodating a substrate for supplying power to the coil therein and a second step part formed to be spaced apart from the first step part.

8 Claims, 5 Drawing Sheets

BASE FOR MOTOR AND HARD DISK DRIVE INCLUDING THE SAME

CROSS-REFERENCE TO RELATED APPLICATIONS

This application claims the priority of Korean Patent Application No. 10-2011-0096166 filed on Sep. 23, 2011, in the Korean Intellectual Property Office, the disclosure of which is incorporated herein by reference.

BACKGROUND OF THE INVENTION

1. Field of the Invention

The present invention relates to a base for a motor and a hard disk drive including the same, and more particularly, to a base for a motor manufactured by pressing processing, having improved rigidity, and allowing for improvements in rotational characteristics of the motor, and a hard disk drive including the same.

2. Description of the Related Art

A hard disk drive (HDD), a computer information storage device, reads data stored on a disk or writes data to a disk using a magnetic head.

According to the related art, a post-processing scheme of die-casting aluminum (Al) and then removing burrs, or the like, generated due to the die-casting, has been used in manufacturing a base provided in the hard disk drive.

However, in the die-casting scheme according to the related art, since a process of forming a shape through the injection of molten state aluminum (Al) for forging is performed, high levels of temperature and pressure are required, such that a large amount of energy is required in the process and a process time is increased.

Further, even in terms of a lifespan of a die-casting mold, there is a limitation in manufacturing a large number of bases using a single mold, and a base manufactured by the die-casting process may have poor dimensional precision.

Therefore, in order to solve defects of the die-casting process, bases have been manufactured using a press process. However, due to the characteristics of a process of bending and cutting a plate, that is, a press process, a base may have not a basically uniform thickness.

Here, in order to couple a substrate for applying power to the base manufactured by the press process, a step should be formed in a predetermined area of the base.

That is, the substrate is coupled to a predetermined space of the base formed by the step. In this case, an interval between the base manufactured by the press process and a core having a coil wound therearound is necessarily changed during a process of forming the step, such that rotational characteristics of a motor may be deteriorated.

SUMMARY OF THE INVENTION

An aspect of the present invention provides a base for a motor having improved rigidity simultaneously with preventing a deterioration in motor rotation characteristics in a case in which a substrate for applying power is coupled to the base manufactured by press processing, and a hard disk drive including the same.

According to an aspect of the present invention, there is provided a base for a motor, the base including: a mounting part having a core mounted therein, the core having a coil wound therearoud in order to generate rotational driving force of a motor; a body part extended from the mounting part in an outer diameter direction; and a first step part formed by depressing a lower surface of the body part facing the core, towards the core and accommodating a substrate for supplying power to the coil therein and a second step part formed to be spaced apart from the first step part.

The first and second step parts may be formed symmetrically with each other based on a rotational axis of the motor.

The first and second step parts may be formed in a circumferential direction.

An upper surface of the body part in which the first and second step parts are formed may be protruded upwardly in an axial direction.

The first step part may include at least one coil lead hole to allow a lead wire of the coil to be coupled to the substrate.

The first step part may be filled with a filler for closing the coil lead hole.

The mounting part and the body part may be formed by press processing.

According to another aspect of the present invention, there is provided a hard disk drive including: the base for a motor as described above; a spindle motor coupled to the base for a motor to thereby rotate a disk; and a head driver transferring a magnetic head for writing data to the disk and reading data from the disk, to a predetermined position on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 1:
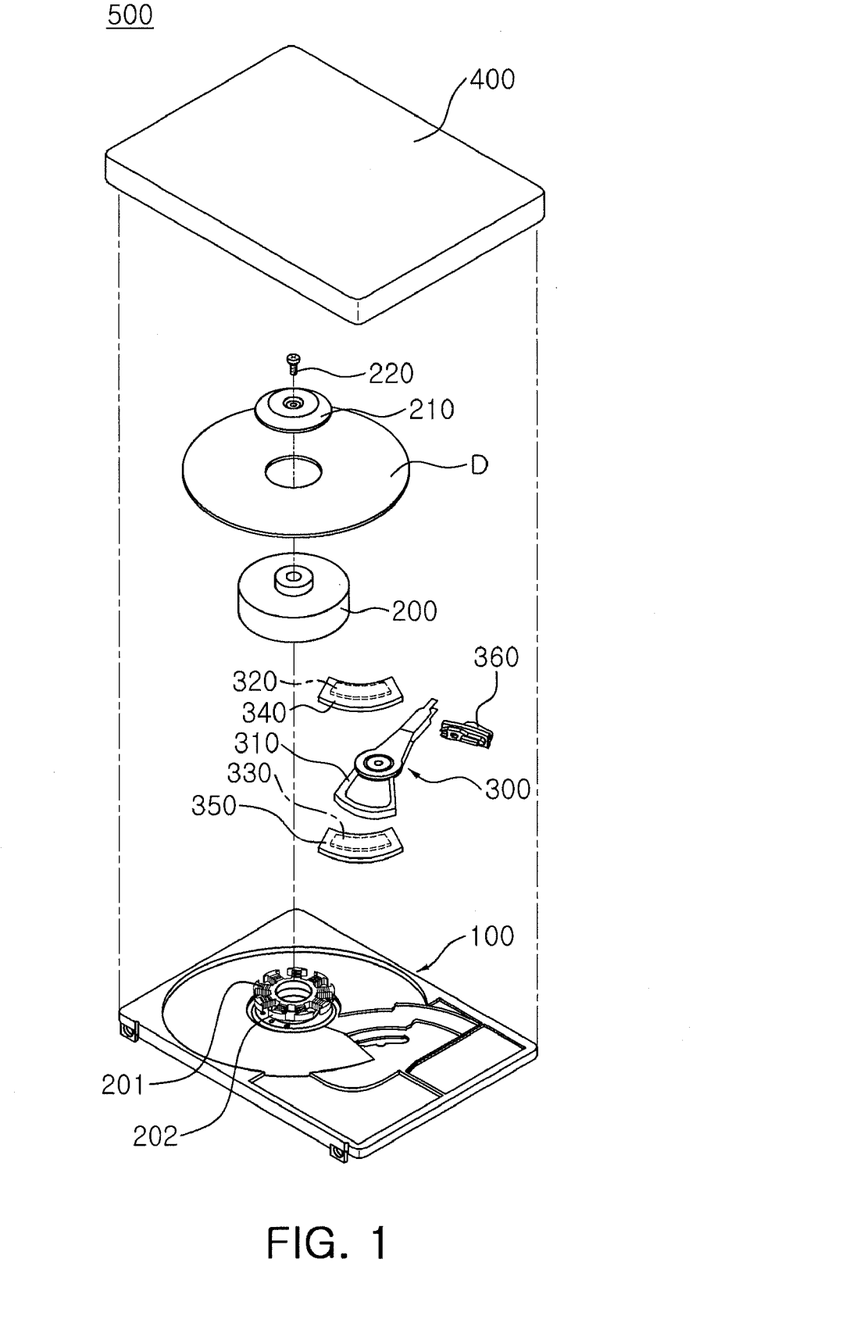
FIG. 1 is an exploded perspective view schematically showing a hard disk drive including a base for a motor according to an embodiment of the present invention.

FIG. 1 is an exploded perspective view schematically showing a hard disk drive including a base for a motor according to an embodiment of the present invention.

Referring to FIG. 1, a hard disk drive 500 including a base 100 for a motor (hereinafter, referred to as a base) according to the embodiment of the present invention may include a spindle motor 200 and a head driver 300 for moving a magnetic head.

First, defining terms with respect to directions, "upwardly in an axial direction" or "downwardly in an axial direction" refers to a direction from an upper surface of the base 100 toward a cover 400, or vice versa, and "an outer diameter direction" or an inner diameter direction" refers to a direction towards an outer edge based on a disk D, or vice versa.

In addition, a circumferential direction refers to a rotation direction of the disk D along an outer peripheral surface of the disk D.

In the hard disk drive 500 according to the embodiment of the present invention, the base 100 refers to a housing forming the exterior of the hard disk drive 500, together with the cover 400, and may include a mounting part 110 (See FIGS. 2 through 5) and a body part 120 (See FIGS. 2 through 5) extended from the mounting part 110 in the outer diameter direction.

Here, the mounting part 110 and the body part 120 may be manufactured to have a base shape by press processing and be then subjected to bending or cutting, which is additional processing, whereby the base 100 having a final shape may be manufactured.

That is, the base 100 according to the embodiment of the present invention may be manufactured through a single process by press processing or through additional processing, unlike the related art post-processing scheme of die-casting aluminum (Al) and then removing burrs, or the like, generated due to the die-casting.

That is, the mounting part 110 and the body part 120 configuring the base 100 may be manufactured by disposing a lightweight alloy steel sheet such as a cold rolled steel sheet (SPCC, SPCE, or the like), a hot rolled steel sheet, a stainless steel, a boron or magnesium alloy, or the like, in a pressing mold and pressing the lightweight alloy steel sheet at a predetermined pressure.

Therefore, the base 100 according to the embodiment of the present invention is manufactured by press processing to minimize a process time and energy consumption, whereby production capability may be improved.

Here, the mounting part 110 may be a part on which a core 202 having a coil 201 wound therearoud in order to generate rotational driving force of the spindle motor 200 is mounted and may be protruded upwardly in the axial direction.

The mounting part 110 may include a seating part 115 (See FIG. 5) formed by a stepped outer peripheral surface thereof, and the core 202 may be seated on the seating part 115, such that the core 202 may be stably fixed to the mounting part 110.

In addition, the body part 120 may form an internal space of the base 100, and the internal space refers to a space in which the spindle motor 200 and the head driver 300 are disposed.

In addition, the body part 120 may include a first step part 122 (See FIG. 2) and a second step part 124 (See FIG. 2) formed therein. Here, the first step part 122 may accommodate a substrate 130 for supplying power to the coil 201 therein and the second step part 124 may be spaced apart from the first step part 122. The first and second step parts will be described in detail below with reference to FIGS. 2 through 5.

The spindle motor 200, which is to rotate the disk D, is fixedly mounted at a central portion of the body part 120.

Here, the spindle motor 200 may be a component including the core 202 having the coil 201 wound therearound and the base 100. However, for convenience, a state in which the spindle motor 200 is separated from the core 202 and the base 100 is shown in FIG. 1.

The disk D coupled to the spindle motor 200 to thereby rotate therewith, may include a writing surface on which data is written.

Here, a clamp 210 may be connected to an upper portion of the spindle motor 200 by a screw 220 in order to firmly fix the disk D to the upper portion of the spindle motor 200.

In addition, although FIG. 1 shows a configuration in which the disk D is singularly mounted on the spindle motor 200, this configuration is only an example. That is, at least one disk D may be mounted on the spindle motor 200.

In a case in which the disk D is provided in plural and the plurality of disks D are mounted as described above, a ring shaped spacer for maintaining an interval between the plurality of disks D may be disposed between the plurality of disks D.

The head driver 300 is called a head stack assembly (HSA) and may be a component having a magnetic head mounted thereon and transferring the magnetic head to a predetermined position to thereby write data to the disk D or read data written on the disk D.

In addition, the head driver 300 may transfer the magnetic head to a predetermined position of the disk D by a voice coil motor (VCM) including a coil 310 and upper and lower magnets 320 and 330.

Here, the respective upper and lower magnets 320 and 330 disposed on upper and lower portions of the coil 310 provided in the VCM may be coupled to upper and lower yokes 340 and 350 in order to increase magnetic flux density and to be fixed to the base 100.

The VCM may be controlled by a servo control system and rotate the head driver 300 in a direction according to the Fleming's left hand rule, based on a pivot axis, due to interaction between a current inputted through the coil 310 provided in the VCM and a magnetic field formed by the upper and lower magnets 320 and 330.

Here, when an operation start command is inputted to the hard disk drive 500 according to the embodiment of the present invention, the disk D may start to rotate, and the VCM may rotate a swing arm in a counterclockwise direction to thereby transfer the magnetic head from a writing surface of the disk D.

On the other hand, when an operation stop command is inputted to the hard disk drive 500 according to the embodiment of the present invention, the VCM may rotate the swing arm in a clockwise direction to thereby allow the magnetic head to be transferred from the disk D.

The magnetic head transferred from the writing surface of the disk D may be parked in a ramp 360 provided outside the disk D.

Here, the ramp 360 may space the magnetic head from the disk D by a predetermined interval in a case in which the magnetic head is transferred to the disk D, simultaneously with allowing the magnetic head to be parked, whereby data of the disk D may be stably read.

Figure 2:
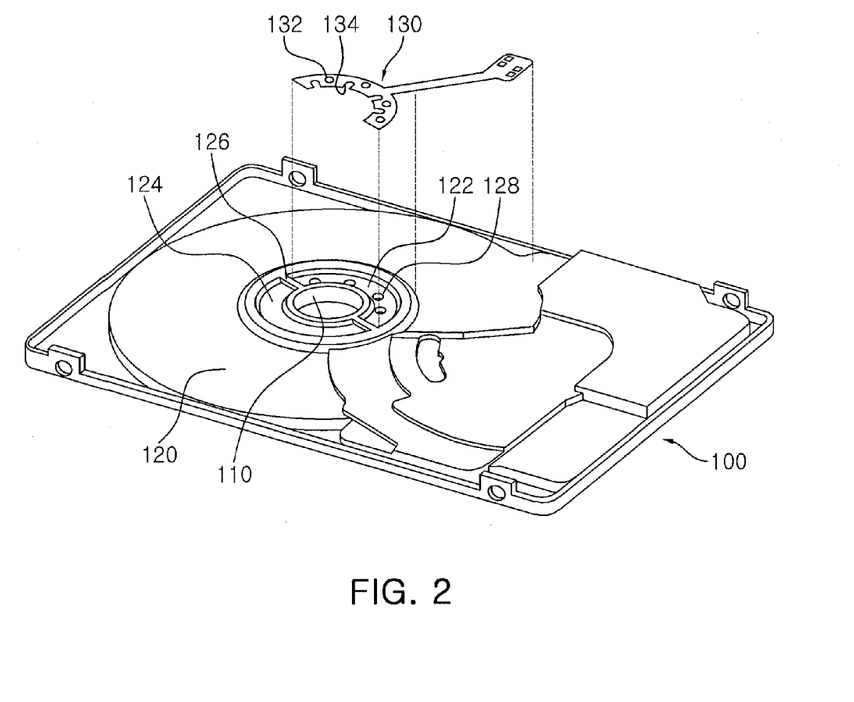
FIG. 2 is an exploded bottom perspective view schematically showing a coupling relationship between the base for a motor according to the embodiment of the present invention and a substrate for applying power.
Figure 3:
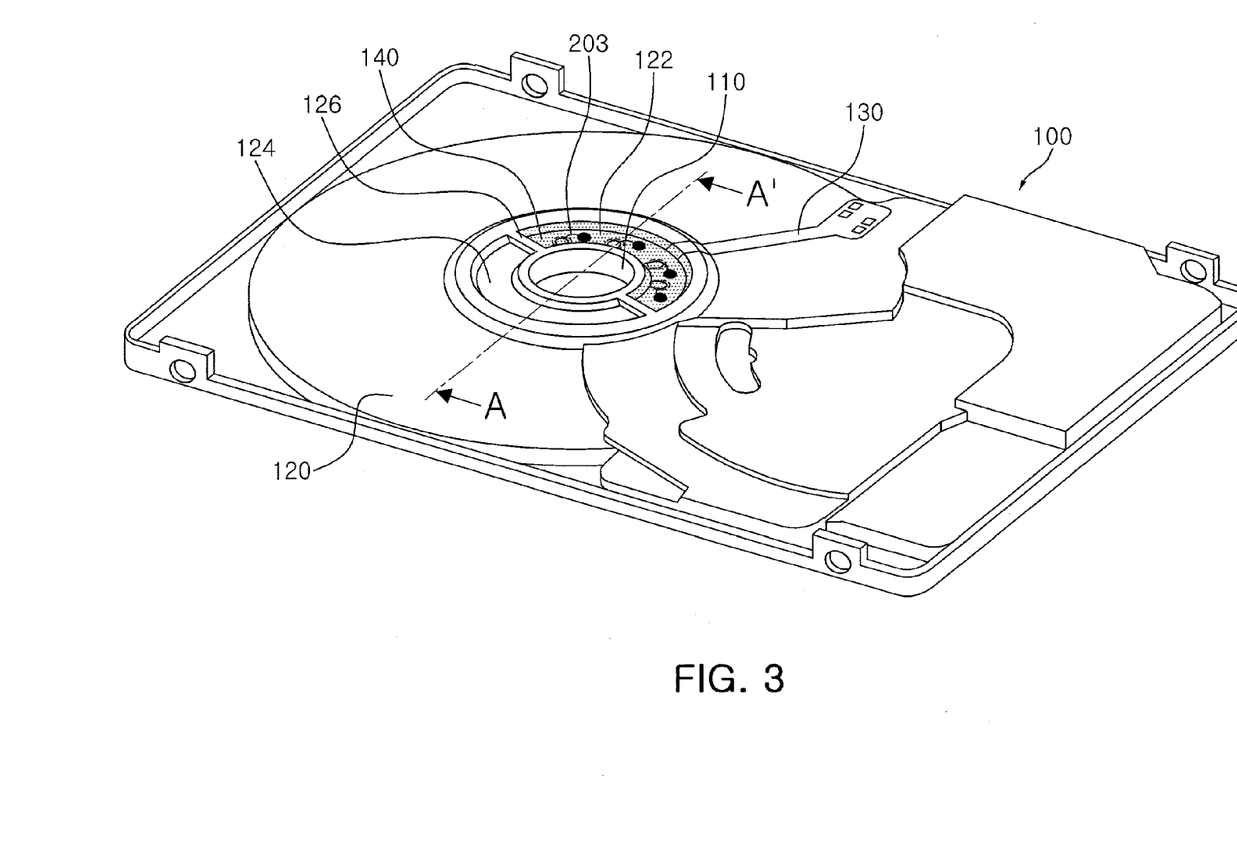
FIGS. 3 and 4 are, respectively, a bottom perspective view and a enlarged bottom view schematically showing a state after the substrate for applying power is coupled to the base for a motor according to the embodiment of the present invention and a first step part is filled with a filler.
Figure 4:
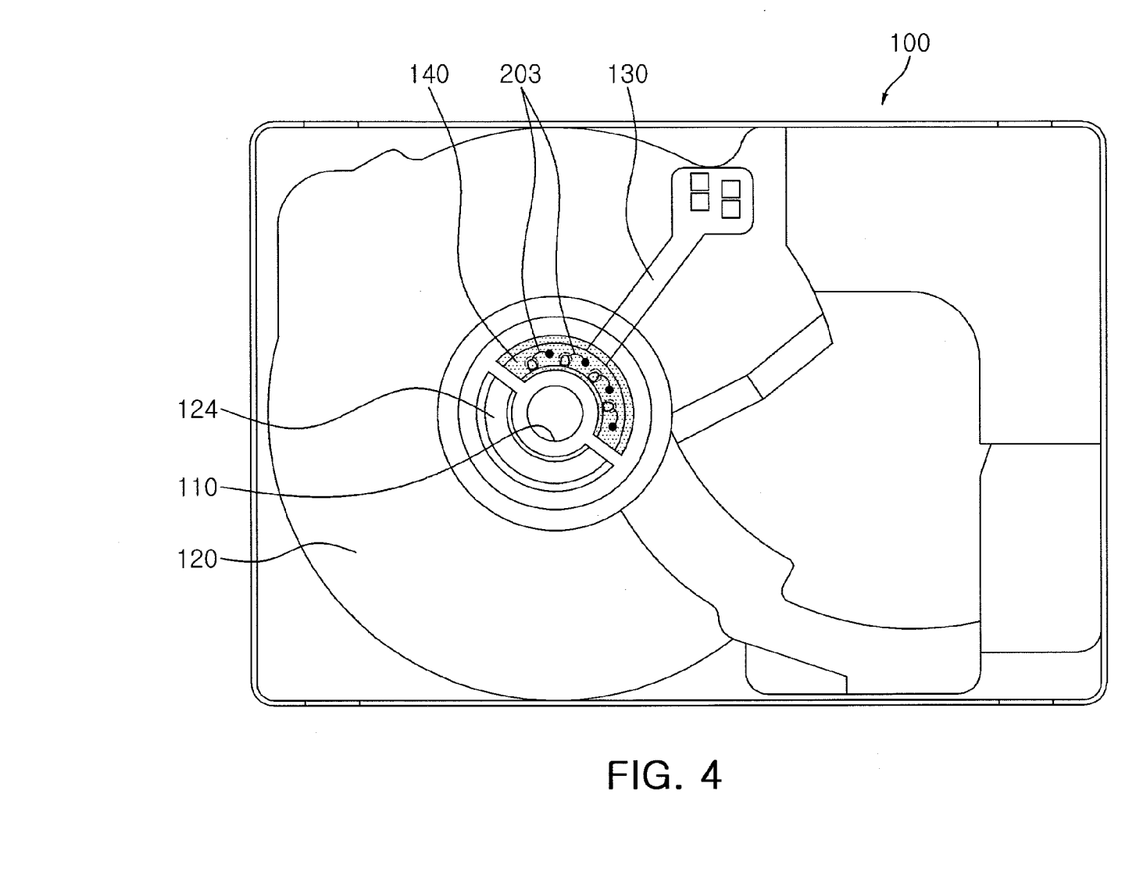
Figure 5:
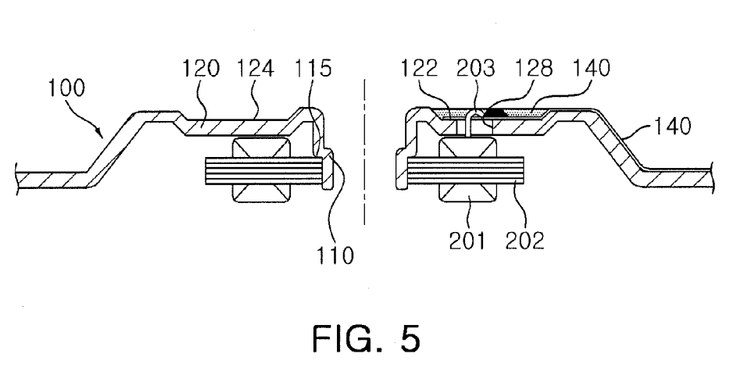
FIG. 5 is a schematic enlarged cross-sectional view taken along line A-A' of FIG. 3.

FIG. 2 is an exploded bottom perspective view schematically showing a coupling relationship between the base for a motor according to the embodiment of the present invention and a substrate for applying power. FIGS. 3 and 4 are, respectively, a bottom perspective view and a enlarged bottom view schematically showing a state after the substrate for applying power is coupled to the base for a motor according to the embodiment of the present invention and a first step part is filled with a filler. FIG. 5 is a schematic enlarged cross-sectional view taken along line A-A' of FIG. 3.

Referring to FIGS. 2 through 5, the base 100 for a motor according to the embodiment of the present invention may include the mounting part 110 having the core 202 coupled thereto and the body part 120 extended from the mounting part 110 in the outer diameter direction, the core 202 having the coil 201 wound therearound.

Here, the body part 120 may include the first step part 122 formed by depressing a lower surface of a predetermined area, that is, an area of the body part 120 facing the core 202, towards the core 202, and the second step part 124 formed to be spaced apart from the first step part 122.

The first and second step parts 122 and 124 may be symmetrical with regard to each other, based on a rotational axis of the spindle motor 200 and may be formed to have a predetermined length in the circumferential direction.

In addition, the first and second step parts 122 and 124 may be spaced apart from each other by a partition wall 126 meaning a boundary therebetween. Here, the partition wall 126 may serve as a blocking wall for preventing a filler 140 filling the first step part 122 from overflowing to the second step part 124.

That is, the first step part 122 may be formed by depressing the lower surface of the body part 120 facing the core 202, towards the core 202, and an upper surface of the body part 120 facing the core 202 may be protruded upwardly in the axial direction due to the characteristics of press processing.

In other words, the first step part 122 may be formed by pressing processing the lower surface of the body part 120 facing the core 202 upwardly in the axial direction and may form a predetermined space.

The predetermined space may accommodate the substrate 130 for applying power to the coil 201 therein, and the substrate 130 may be coupled to the base 100 without being protruded to the outside, due to the first step part 122.

Here, the substrate 130 may be a flexible printed circuit board and include a land part 132 for electrical connection with a coil lead wire 203.

The land part 132 may be coupled to the coil lead wire 203 led to the outside while penetrating through at least one coil lead hole 128 formed in the first step part 122, by soldering.

That is, the first step part 122 may include the least one coil lead hole 128 for soldering-coupling between the coil lead wire 203 and the substrate 130 for applying power to the coil 201.

The coil lead wire 203 penetrating through the coil lead hole 128 may be extended to the land part 132, and the substrate 130 may include at least one guide groove 134 formed therein in order to extend the coil lead wire 203 to the land part 132, the at least one guide groove 134 corresponding to the coil lead wire 203.

That is, the guide groove 134 and the coil lead hole 128 may be disposed in the same axial direction, and the land part 132 may be formed to be adjacent to the guide groove 134.

Here, after the coil lead wire 203 led to the outside while penetrating through the coil lead hole 128 is coupled to the land part 132, the coil lead hole 128 needs to be closed in order to maintain air tightness.

That is, after the coil lead wire 203 and the land part 132 of the substrate 130 are coupled by the soldering, the first step part 122 may be filled with a filler 140 in order to close the coil lead hole 128.

The space formed by the first step part 122 may be filled with the filler 140, and a soldered portion between the coil lead wire 128 and the land part 132 may be enclosed due to the filler 140.

Here, the filler 140 may be a kind of UV bond and serve to enclose the coil lead hole 128 in order to maintain air tightness as described above.

Therefore, the filler 140 needs to fill the first step part 122 so as to be enough to close the coil lead hole 128. When an excessive amount of the filler is used, the use of the filler becomes meaningless.

A component allowing the filler 140 to be minimally used may be the second step part 124 spaced apart from the first step art 122.

That is, the second step part 124 may be separated from the first step part 122 by the partition wall 126, which may prevent the filler 140 filling the first step part 122 from drawing in the second step part 124.

In addition, the second step part 124 may serve to prevent a deterioration in rotational characteristics of the spindle motor 200, The prevention may be implemented by maintaining an interval between a magnet coupled to a hub, which is a rotating member of the spindle motor 200, and the base 100 to be constant.

In other words, in order to couple the substrate 130 for applying power to the base 100, the first step part 122 may be formed in the body part 120 of the base 100. Due to the first step part 122, the upper surface of the body part 120 of the base 100 facing the core 202 may be protruded toward the core 202.

Therefore, when only the first step part 122 is formed, the interval between the magnet coupled to the hub and the base 100 may be varied in the circumferential direction, such that rotational characteristics of the spindle motor 200 are deteriorated.

However, in the case of the base 100 for a motor according to the embodiment of the present invention, the interval between the magnet coupled to the hub and the base 100 may be maintained to be constant due to the second step part 124 formed symmetrically with the first step part 122 based on the rotational axis of the spindle motor 200.

Therefore, even in a case in which the base 100 is manufactured by press processing, the deterioration of the rotational characteristics of the spindle motor 200 may be prevented by the second step part 124 having the same configuration as the first step part 122.

In addition, the rigidity of the base 100 for a motor according to the embodiment of the present invention may be increased due to the partition wall 126, which is a boundary between the first and second step parts 122 and 124.

This is due to the fact that the partition wall 126 relatively protruded downwardly in the axial direction as compared to the first and second step parts 122 and 124 may serve as a rib reinforcing rigidity of the base 100 according to the embodiment of the present invention simultaneously with spacing the first and second step parts 122 and 124 from each other.

Through the above-mentioned embodiment, since the interval between the base 100 and the magnet of the spindle motor 200 may be maintained to be constant by the first step part 122 and the second step part 124 formed symmetrically with respect to the first step part 122, based on the rotational axis of the motor, a deterioration in the rotational characteristics of the spindle motor 200 may be prevented.

In addition, since the second step part 124 is spaced apart form the first step part 122 by the partition wall 126, an amount of the filler 140 filling the first step part 122 may be significantly reduced.

In addition, rigidity of the base 100 according to the embodiment of the present invention may be increased due to the partition wall 126, which is a boundary between the first and second step parts 122 and 124.

As set forth above, with the base for a motor and the hard disk drive including the same according to embodiments of the present invention, in a case in which the substrate is coupled to the base manufactured by press processing, a deterioration in the rotational characteristics of the motor may be prevented.

In addition, an amount of the filler for air tightness may be significantly reduced, and rigidity of the base may be increased.

Further, the base is manufactured by press processing to significantly reduce a process time and energy consumption, whereby production capability may be improved.

While the present invention has been shown and described in connection with the embodiments, it will be apparent to those skilled in the art that modifications and variations can be made without departing from the spirit and scope of the invention as defined by the appended claims.

What is claimed is:

1. A base formed of a steel sheet for a motor, the base comprising:
   a mounting part having a core mounted therein, the core having a coil wound therearoud in order to generate rotational driving force of a motor;
   a body part extended from the mounting part in an outer diameter direction;
   a first step part formed by depressing a lower surface of the body part facing the core, towards the core, and accommodating a substrate for supplying power to the coil therein; and
   a second step part formed to be on the same surface as the first step part and formed to be adjacent to the first step part, zoned apart therefrom by a partition wall.

2. The base of claim 1, wherein the first and second step parts are formed symmetrically with each other based on a rotational axis of the motor.

3. The base of claim 1, wherein the first and second step parts are formed in a circumferential direction.

4. The base of claim 1, wherein an upper surface of the body part in which the first and second step parts are formed is protruded upwardly in an axial direction.

5. The base of claim 1, wherein the first step part includes at least one coil lead hole to allow a lead wire of the coil to be coupled to the substrate.

6. The base of claim 5, wherein the first step part is filled with a filler for closing the coil lead hole.

7. The base of claim 1, wherein the mounting part and the body part are formed by press processing.

8. A hard disk drive comprising:
   the base for a motor of claim 1;
   a spindle motor coupled to the base for a motor to thereby rotate a disk; and
   a head driver transferring a magnetic head for writing data to the disk and reading data from the disk, to a predetermined position on the disk.

* * * * *

UNITED STATES PATENT AND TRADEMARK OFFICE
CERTIFICATE OF CORRECTION

PATENT NO. : 8,373,942 B1  Page 1 of 1
APPLICATION NO. : 13/325422
DATED : February 12, 2013
INVENTOR(S) : Il Geun Jeon It is certified that error appears in the above-identified patent and that said Letters Patent is hereby corrected as shown below:

Title Page, Column 2 (Abstract), Line 3, Delete "therearoud" and insert -- therearound --, therefor.

In the Claims

Column 7, Line 19 (Approx.), In Claim 1, delete "therearoud" and insert -- therearound --, therefor.

Signed and Sealed this
Sixteenth Day of July, 2013

Teresa Stanek Rea
*Acting Director of the United States Patent and Trademark Office*